Figure 1:
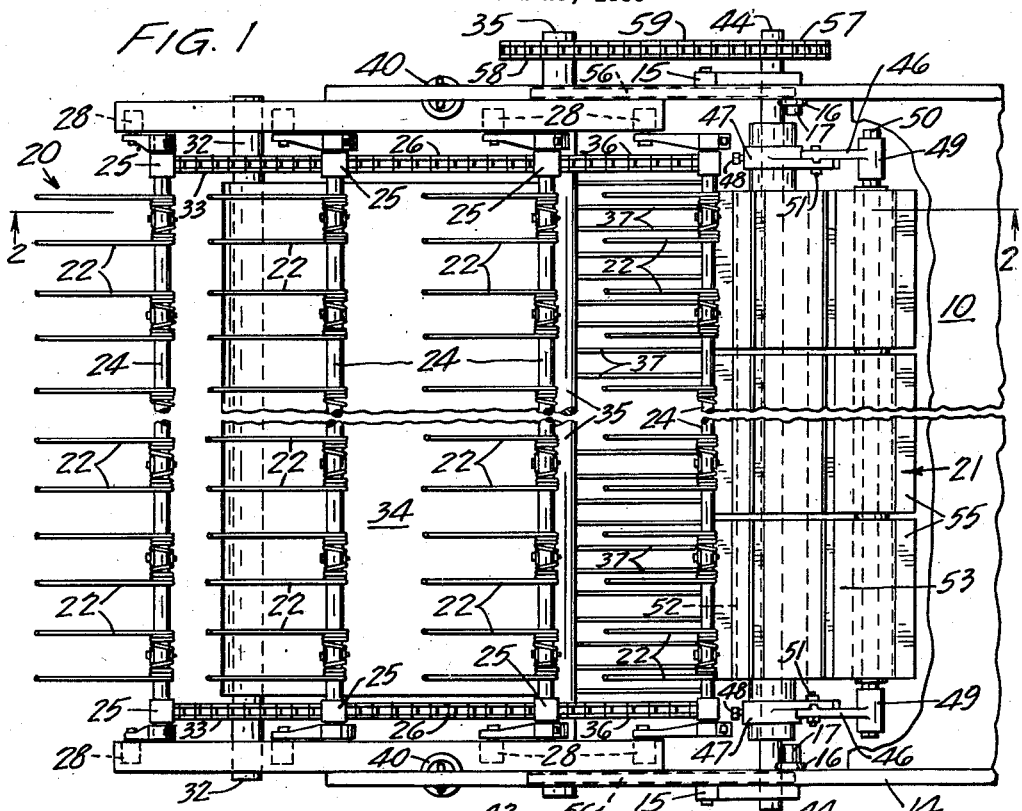

June 11, 1957 F. SUND 2,795,100

PICK-UP ATTACHING MEANS FOR COMBINE

Filed March 29, 1955

INVENTOR
FRED SUND
BY
Williamson, Schroeder, Adams & Meyers
ATTORNEYS

United States Patent Office 2,795,100
Patented June 11, 1957

2,795,100

PICK-UP ATTACHING MEANS FOR COMBINE

Fred Sund, Newburg, N. Dak.

Application March 29, 1955, Serial No. 497,538

6 Claims. (Cl. 56—364)

This invention relates to a pick-up attachment for combines, and more particularly to a free riding attachment which will adapt itself to travel over uneven terrain.

In my prior United States Patent No. 2,284,777, I disclose a pick-up attachment which is adapted to be secured to the front of a conventional combine and has a beater bar in timed clearance with the pick-up teeth or tines thereof to transfer cut grain from the ground to the platform of the combine. In this and other prior art pick-up attachments of which I am aware, the mounting structure is more or less rigid with respect to the front end of the combine and, therefore, must be provided with caster wheels or other mechanism for easy turning, and the mounting structure must be strong enough to withstand force exerted when the wheels of the combine travel at a different level than those of the pick-up attachment. Where sudden shock is applied to the mounting structure, as where the wheels of the combine or pick-up attachment fall into ditches, holes and the like, there is apt to be breakage of the mounting material and consequent damage to the combine or attachment. Where the pick-up attachment is permitted to oscillate vertically about a single pair of caster wheels, the angulation of the pick-up attachment will be varied during travel of the device. Such variation will cause skipping of cut grain by the pick-up teeth riding in clearance above the ground or, on the other hand, may cause the pick-up teeth to dig into the ground and damage the equipment or actually pick up clods of sod and stones. Furthermore, the haphazard angulation of the pick-up tines or teeth in their revolving action tends to cause a deviation from the optimum cooperation relationship between the pick-up teeth and the mechanism which transfers the cut grain to the combine platform.

In the particular flexible fin draper mechanism which wipes and transfers cut grain from the rearward portion of the raking pick-up to the platform, it becomes particularly desirable to maintain the proper relationship between the draper belts and the raking pick-up while, at the same time, maintaining a predetermined spacing relationship between rolling terrain and the lower curved points of the pick-up teeth, as well as proper relationship between the fin draper and the combine platform for purposes of maintaining a continuous and complete transfer of cut grain to the combine proper.

With the foregoing in mind, it is, therefore, an important object of this invention to provide a pick-up attachment for combines which will effectively transfer cut grain from uneven terrain to the combine platform without sacrificing efficiency and without endangering the life of the equipment.

It is another object of the invention to provide a pick-up attachment for combines in which a raking pick-up portion of the entire attachment will maintain constant spaced relation with the ground irrespective of variations in contour and will transfer cut grain to a draper portion of the attachment which will maintain constant spaced relationship with respect to the combine, yet will provide proper and efficient transfer of cut grain across the raking pick-up and draper irrespective of relative movement therebetween during operation.

A still further object of the invention is to provide a floating mount structure which will achieve the foregoing relationship between the pick-up and draper portions of the attachment and will, at the same time, permit driving connection between the mechanism of each portion during undulating travel over the terrain.

Figure 2:
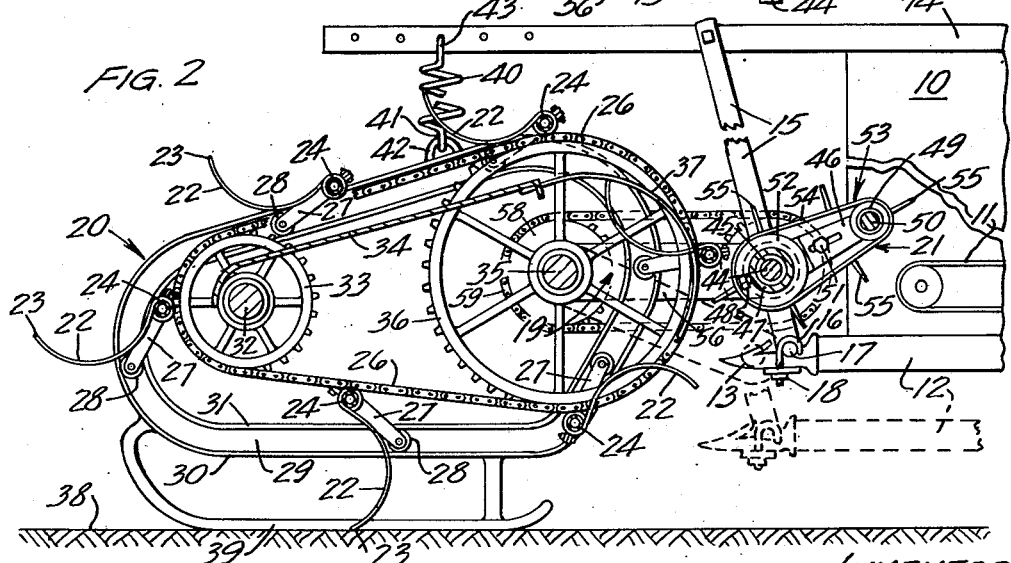

These and other objects and advantages of my invention will more fully appear from the following description, made in connection with the accompanying drawings wherein like reference characters refer to the same parts throughout the several views and in which:

Fig. 1 is a plan view of the forward end of a conventional combine to which is attached my pick-up attachment, medial portions of the attachment being mere duplicity and therefore cut away from the view; and Fig. 2 is a vertical section of my attachment taken on the lines 2—2 of Fig. 1, the dotted line configuration of the mounting structure showing a different relationship between the raking pick-up part of the attachment with respect to the combine and draper, such as may be assumed during operation of the apparatus over uneven terrain.

With continued reference to the drawing, my present invention is intended to be attached to an ordinary conventional combine 10 having a platform or apron 11 and a sickle mechanism 12 having guards 13, as shown in Fig. 2. The combine is preferably provided with a rigid forwardly extending arm 14 for a purpose to be subsequently described. A pair of spaced struts 15 may be secured rigidly adjacent the sickle guards 13 as by means of bent clamps 16 clamped over abutments 17 and capable of being tightened by such means as a threaded nut connection 18, as shown in Fig. 2. My invention relates particularly to a mounting and drive connection 19 which is interposed between a forwardly positioned raking mechanism 20 and a draper belt mechanism 21 so as to pick up and transfer cut grain and the like from the surface of the ground rearwardly to the combine apron or platform 11.

The raking mechanism 20 may be of any structure wherein cut grain is efficiently picked up and moved upwardly and rearwardly to a position forwardly of the combine 10 so as to clear the combine parts, including the sickle guards 13. The pick-up raking mechanism 20 which is shown in the present patent application is somewhat similar to that disclosed in my earlier Patent No. 2,284,777. Briefly, the raking mechanism consists of a plurality of teeth or tines 22 positioned in row formation with the outer ends of each set of teeth in the tooth structure curved outwardly to terminate in a transverse terminal line 23 and rigidly mounted upon a lateral shaft 24 which, in turn, is rockably journaled within spaced and aligned bearings 25, each pair of which are respectively mounted on endless chain belts 26. A radius arm 27 is secured to each of the shafts 24 at one end and has, at the other end, a roller 28 which, in turn, is adapted to ride in the pathway 29 defined by an outer track 30 and an inner track 31. A forward shaft 32 is journaled across the raking mechanism and has secured thereto a pair of sprockets 33 each in alignment with a respective roller belt 26. A pan 34 is disposed across the mechanism and lies under the tooth structure as it passes thereover in its uppermost rearward traveling position. A drive shaft 35 is journaled across the raking mechanism 20 and has exteriorly secured therewith a pair of sprocket wheels 36, each of which is in alignment and driving connection with a roller belt 26. The apron 34 has secured rearwardly thereof a plurality of stripper bars 37 which are downwardly and rearwardly curved in alternate relation with the projected pathways of the individual teeth 22 in the revolving movement of the tooth structure in the raking mechanism.

It will be observed that the rollers 28 follow in pathway 29 which is not coincident with, or even parallel to, the pathway of the roller chains 26. As a consequence, the curved tooth structures are positioned in a horizontal cradle in their uppermost travel, but quickly fall inwardly as they begin their downward descent through stripper bars 37, as will be observed from an inspection of Figs. 1 and 2. As each tooth structure continues downwardly, the curved teeth are again caused to emerge and extend downwardly so as to lightly contact or travel in spaced clearance with the surface 38 of the ground, as shown in Fig. 2.

In order to prevent digging and gouging of the teeth 22, it is important to maintain the entire raking mechanism 20 in spaced parallel clearance with the surface of the ground 38. This may be accomplished by several means, but I prefer to utilize a pair of skids or runners 39 which are secured in depending relation with respect to the underside of the raking mechanism and which will glide smoothly and surely along the ground surface 38 irrespective of undulations and contours in the surface thereof. In order to assist the raking mechanism in its forward ground-contacting movement, I prefer to suspend a portion of the weight of the mechanism by such means as tension spring 40 which terminates downwardly in a hook 41 engageable with a ring 42 fastened to an upper part of the supporting frame of raking mechanism 20. The upper end of spring 40 terminates in a hook 43 which is secured to the rigid arm 14 extending forwardly of the combine 10.

The belt draper mechanism 21 generally comprises a shaft 44 journaled across a pair of bearings 45 which are, in turn, secured to the standards or struts 15, as shown. Brackets 46 are adjustably secured through collars 47 and set screws 48 to the fixed bearings 45. Thus, the angulation of the bracket members 46 can be controlled with respect to the combine members including the platform or apron 11. It is, of course, essential that the brackets be exactly aligned. The outer ends of brackets 46 are provided with respective journals 49 which are adapted to receive an idler shaft 50. Fastening members 51 permit separation and reconstruction of the bracket members during mounting of the various parts.

Disposed about a medial cylindrical enlarged portion 52 of the belt shaft 44 are a plurality of individual draper belts 53, as shown in Fig. 1. Each of these draper belts 53 comprises a flexible flat portion 54 and a plurality of upstanding spaced flexible fins 55 which are adapted to contact the stripper bars 37 of the raking mechanism 20 and to yield whenever a bar 24 passes rearwardly around the stripper bars.

A floating link connection 19 is provided for driving the raking mechanism 20 in a forward direction while maintaining proper relative positioning of the raking mechanism with respect to the fin draper belt. In order to accomplish this floating link connection, I provide a pair of interconnecting arms or links 56 which are pivotally mounted about the shafts 44 and 35 respectively, and at each side of the entire attachment. The floating links 56 are thus permitted to move vertically but prevent lateral relative shifting of the mechanisms. The radius of the floating links with respect to the axes of the shafts 44 and 35 is such as to maintain proper contact and transferring relation between the finned belts 53 and the rear of the raking mechanism 20 during operation of the combine and attachment during travel over undulating or contoured ground, as will be presently described.

At the outer extremities of shafts 44 and 35 are secured respective sprockets 57 and 58. A roller chain belt 59 drivably interconnects the sprockets and, hence, causes simultaneous rotation of the shafts 44 and 35 and in the same direction. It will be observed that the roller chain 59 will maintain proper driving connection between the shafts irrespective of the relative vertical positions of the raking mechanism 20 with respect to the combine 10 and the draper belt mechanism 21 which is secured thereto.

In the use and operation of my pick-up attachment, the mechanisms are mounted in the relative positions shown with the fin draper 21 terminating in overlying relation with the apron or combine platform 11. The spring 40, of course, holds a substantial portion of the weight of the raking mechanism 20 but permits the ground-contacting members 39 to maintain contact with the ground 38 and to permit the toothed structures 23 to move forwardly at their lowermost position in spaced parallel clearance or in light contact with the surface of the ground 38. As the teeth move upwardly, they are adapted to lift and cradle cut grain so as to move it rearwardly and upwardly as the entire combine and attachment travel forwardly. As the teeth pass through the stripping bars 37, the cut grain is transferred to the draper belt 21 and the flexible fins continuously wipe the stripper bars as the shafts or bars 24 pass over the surface of the stripper bars 37. The teeth are permitted to clear the sickle guards 13 and the fin draper belt 21 carries the cut grain rearwardly to deliver it upon the platform or apron 11 from which position it is transferred in conventional manner to the threshing mechanism in the combine.

Now, if the combine should drop into a depression, the entire draper mechanism will drop to the dotted line position along with the combine, and the floating link connection 19 will merely permit oscillation thereof around the shaft 35 as a center. At the same time, the floating connection will pivot to a slight degree around the shaft 44 but operating contact will be maintained all the while. No shock will be transmitted to either the raking mechanism 20, to the combine itself, or to the interconnecting structure. Likewise, if the combine should strike a raised area in the ground, the draper mechanism will move upwardly but still will maintain operating contact all the while. It will be further observed that since the roller chain 59 operates on sprockets 57 and 58 which have the same centers as shafts 44 and 35, there will be no tensioning or slackening of the chain belt and the pick-up mechanism will continue smoothly in its operation.

It will, of course, be understood that various changes may be made in the form, details, arrangement and proportion of the parts without departing from the scope of my invention.

What I claim is:

1. A pick-up attachment for a conventional combine having a platform, said attachment comprising, a raking mechanism having revolving tooth structure adapted to contact cut grain lying upon the ground, ground-contacting members secured in depending relation with said raking mechanism and maintaining a predetermined clearance between the tooth structure and the ground during forward travel thereof, a resilient suspension secured to said raking mechanism at its lower end and securable to a forwardly extending rigid part of said combine for supporting a portion of the weight of said raking mechanism, said ground-contacting members having spaced parallel relation with the structure for maintaining constant clearance between the ground and the partially supported raking mechanism, a draper belt mechanism securable transversely of a forward portion of the combine and adapted to revolve rearwardly at its upper surface and to terminate in overlying relation with the combine platform, and a floating link connection pivotally securable for vertical movement with a forward portion of said combine and extending forwardly to vertically pivotal connection with said raking mechanism whereby to establish wiping and transferring relation between said draper belt and said raking mechanism irrespective of vertical shifting movement therebetween during forward travel.

2. A pick-up attachment for a conventional combine having a platform, said attachment comprising, a raking mechanism having revolving tooth structure adapted to contact cut grain lying upon the ground and move it upwardly and rearwardly, a draper belt mechanism securable transversely of the combine and adapted to revolve rearwardly at its upper portion and to terminate in overlying relation with a combine platform, a belt shaft adapted to be rotatably journaled in predetermined relation forwardly of the combine platform and in supporting and driving relation with said draper belt, a drive shaft rotatably journaled across the raking mechanism and having driving connection with said revolving tooth structure, a floating link pivotally interconnected between said raking mechanism and said draper belt mechanism, said floating link being mounted pivotally with respect to the axis of said belt shaft adjacent the rear end thereof and pivotally connected adjacent the forward end with the axis of the drive shaft on said raking mechanism, and a belt drive drivably connecting said belt shaft and said drive shaft whereby said draper belt mechanism will wipe and transfer cut grain rearwardly to said combine platform and maintain said relation with respect to the raking mechanism while simultaneously maintaining rotatable driving relation between said shafts irrespective of relative vertical shifting between the raking mechanism and said draper belt mechanism during forward travel of a combine with said attachment secured thereto.

3. A pick-up attachment for a conventional combine having a platform, said attachment comprising, a raking mechanism having revolving tooth structure adapted to contact cut grain lying upon the ground and further having a drive shaft transversely journaled across the raking mechanism for driving said revolving tooth structure, a draper belt securable transversely of the combine and adapted to revolve rearwardly at its upper portion and terminating in overlying relation with the combine platform, a belt shaft adapted to be rotatably journaled in predetermined relation forwardly of the combine platform and providing support and driving force for said draper belt, and a floating link connection pivotally secured with respect to the axis of said belt shaft and extending forwardly to pivotal connection with the axis of said drive shaft on said raking mechanism whereby to establish wiping and transferring relation between said draper belt and said raking mechanism irrespective of relative vertical shifting between the raking mechanism and combine platform during forward travel of the combine with attachment secured thereto.

4. A pick-up attachment for a conventional combine having a platform, said attachment comprising, a raking mechanism having a drive shaft rotatably journaled across the raking mechanism and a revolving tooth structure in driven connection therewith for contacting cut grain lying upon the ground, ground-contacting means secured in depending relation with said raking mechanism and maintaining a predetermined clearance between said tooth structure and the ground during forward travel thereof, a draper belt mechanism securable transversely of the combine and adapted to revolve rearwardly at its upper portion and terminating in overlying relation with the combine platform, a belt shaft adapted to be rotatably journaled in predetermined relation forwardly of the combine platform and adapted to support and revolve said draper belt, and a floating link connection pivotally secured with respect to the axis of said belt shaft and extending forwardly to pivotal connection with the axis of the drive shaft on said raking mechanism whereby to establish wiping and transferring relation between said draper belt and said raking mechanism at all times irrespective of vertical relative shifting between the raking mechanism and said combine during forward travel thereof.

5. A pick-up attachment for a conventional combine having a platform, said attachment comprising, a raking mechanism having a tooth structure revolving about two parallel axes transverse to the direction of travel of the combines and adapted to contact cut grain lying upon the ground, a pair of elongated skids secured in fixed relation to said two parallel axes beneath said raking mechanism and establishing a predetermined clearance between the tooth structure and the ground during forward travel thereof, a draper belt mechanism securable transversely of the combine and adapted to revolve about a transverse axis in a rearward direction at its upper portion and to terminate in overlying relation with the combine platform, and a mounting and drive connection mechanism secured rearwardly on the same transverse axis as said draper belt for vertical swinging movement with respect to said combine platform and secured pivotally for vertical swinging movement with respect to the rearmost of the parallel axes of the toothed raking mechanism whereby to establish a wiping and transferring relation between said draper belt and said raking mechanism irrespective of relative vertical shifting between the raking mechanism and said draper belt during forward travel of the combine when said attachment is secured thereto.

6. A pick-up attachment for a conventional combine having a platform, said attachment comprising, a toothed raking mechanism revolvably mounted on a drive shaft disposed transversely to the direction of travel of the combine, a fin draper revolvably mounted on a forward and a rearward shaft in parallel relation and transverse with respect to the direction of travel of the combine, said fin draper overlying at its rear the platform of the combine for delivery of cut grain thereto, and a mounting and driving link connection pivotally mounted at its rear about the axis of the forward shaft of the fin draper and pivotally mounted at its fore about the axis of said drive shaft whereby said toothed raking mechanism and said fin draper may each move vertically relative to the other while maintaining a constant circumferential relationship therebetween for uniform and positive transfer of cut grain rearwardly from the toothed raking mechanism to the fin draper and thence to the combine platform.

References Cited in the file of this patent

UNITED STATES PATENTS

| | | |
|---|---|---|
| 1,923,104 | Mainland | Aug. 22, 1933 |
| 2,488,738 | Pool | Nov. 22, 1949 |